United States Patent
Carballo et al.

(10) Patent No.: US 7,522,670 B2
(45) Date of Patent: Apr. 21, 2009

(54) DIGITAL TRANSMISSION CIRCUIT AND METHOD PROVIDING SELECTABLE POWER CONSUMPTION VIA SINGLE-ENDED OR DIFFERENTIAL OPERATION

(75) Inventors: Juan-Antonio Carballo, San Jose, CA (US); Kevin John Nowka, Georgetown, TX (US); Ivan Vo, Austin, TX (US); Seung-moon Yoo, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 11/050,605

(22) Filed: Feb. 3, 2005

(65) Prior Publication Data

US 2006/0171477 A1 Aug. 3, 2006

(51) Int. Cl.
H04B 3/00 (2006.01)
(52) U.S. Cl. ..................................................... 375/257
(58) Field of Classification Search ................. 375/257, 375/219, 222, 295, 316, 259; 370/282, 284, 370/276; 379/90.01, 93.01, 93.05, 93.06; 455/91, 127.1; 326/62, 82, 86
See application file for complete search history.

(56) References Cited

U.S. PATENT DOCUMENTS

| | | | |
|---|---|---|---|
| 3,587,044 A | 6/1971 | Jenkins | |
| 3,676,583 A | 7/1972 | Morita et al. | |
| 4,092,596 A | 5/1978 | Dickinson et al. | |
| 4,803,638 A | 2/1989 | Nottingham et al. | |
| 4,819,196 A | 4/1989 | Lilley | |
| 5,016,269 A | 5/1991 | Rogers | |
| 5,126,686 A | 6/1992 | Tam | |
| 5,220,678 A | 6/1993 | Feei | |
| 5,422,760 A | 6/1995 | Abbott et al. | |
| 5,872,810 A | 2/1999 | Philips et al. | |
| 5,880,837 A | 3/1999 | Roberts | |
| 5,912,920 A | 6/1999 | Marchok | |
| 5,982,833 A | 11/1999 | Waters | |

(Continued)

OTHER PUBLICATIONS

Chang, et al.; "A 50 Gb/s 32×32 CMOS Crossbar Chip using Asymmetric Serial Links"; 1999 Symposium on VLSI Circuits Digest of Technical Papers, IEEE Solid-State Circuits Society.

(Continued)

Primary Examiner—Mohammad H Ghayour
Assistant Examiner—Vineeta S Panwalkar
(74) Attorney, Agent, or Firm—Mitch Harris, Atty at Law, LLC; Andrew M. Harris; Casimer K. Salys (57) ABSTRACT

A digital transmission circuit and method providing selectable power consumption via single-ended or differential operation improves the flexibility of an interface while reducing power consumption when possible. A differential path is provided through the transmitter output driver stages and portions are selectively disabled when the transmission circuit is in a lower-power operating mode. A single-ended to differential converter circuit can be used to construct a differential signal for output to the final driver stage. The selection of power mode can be made via feedback from a channel quality measurement unit or may be hardwired or selected under programmatic control. The longer delay or skew of the lower-power single-ended mode is compensated for by the relaxed requirements of the channel when conditions permit the use of the lower-power single-ended mode.

21 Claims, 4 Drawing Sheets

U.S. PATENT DOCUMENTS

| | | | |
|---|---|---|---|
| 6,092,212 A * | 7/2000 | Muljono et al. | 713/600 |
| 6,134,214 A | 10/2000 | Takagi et al. | |
| 6,178,215 B1 | 1/2001 | Zhang et al. | |
| 6,215,816 B1 | 4/2001 | Gillespie et al. | |
| 6,226,356 B1 * | 5/2001 | Brown | 379/24 |
| 6,282,045 B1 | 8/2001 | Glover | |
| 6,304,615 B1 | 10/2001 | Webster | |
| 6,377,076 B1 | 4/2002 | Gauthier | |
| 6,389,069 B1 | 5/2002 | Mathe | |
| 6,549,604 B2 | 4/2003 | Shenoi | |
| 6,580,930 B1 | 6/2003 | Fulghum et al. | |
| 6,810,216 B1 | 10/2004 | Tourunen | |
| 6,891,708 B2 * | 5/2005 | Hutamura et al. | 361/100 |
| 2002/0101913 A1 * | 8/2002 | Masters et al. | 375/219 |
| 2002/0180480 A1 | 12/2002 | Dreps | |
| 2003/0062926 A1 | 4/2003 | Wilcox et al. | |
| 2004/0051555 A1 | 3/2004 | Wilcox et al. | |
| 2004/0051565 A1 | 3/2004 | Dreps | |
| 2004/0113656 A1 * | 6/2004 | Sato | 326/86 |
| 2004/0203477 A1 | 10/2004 | Carballo | |
| 2004/0203483 A1 | 10/2004 | Carballo | |
| 2004/0257114 A1 | 12/2004 | Hanneberg et al. | |
| 2005/0240386 A1 | 10/2005 | Carballo | |
| 2006/0017462 A1 * | 1/2006 | Kao | 326/62 |

OTHER PUBLICATIONS

Khoury, et al.; "High-Speed Serial Transceivers for Data Communication Systems"; IEEE Communications Magazine, Jul. 2001, vol. 39, issue 7.

Yang, et al,; "A 0.5um CMOS 4.0-Gbit/s Serial Link Transceiver with Data Recovery Using Oversampling"; IEEE JSSC, May 1998, vol. 33, issue 5.

De Araujo, et al., "Transmitter and Channel Equalization for High-Speed Server Interconnects", IEEE MTT and CPMTS, Symposium Oct. 2003.

Lee, et al., "An 84-mW 4-Gb/s Clock and Data Recovery Circuit for Serial Link Applications"; 2001 Symposium on VLSI Circuits Digest of Technical Papers, IEEE Solid State Circuits Society.

Dwivedi, et al., "Traffic Model for USA Long-distance Optical Network", Optical Fiber Communication Conference, 2000, vol. 1, pp. 156-158.

Mehta, et al., "Fixed Sensor Networks for Civil Infrastructure Monitoring—An Initial Study", Dept. of ICS, UC Irvine, Aug. 2002.

* cited by examiner

DIGITAL TRANSMISSION CIRCUIT AND METHOD PROVIDING SELECTABLE POWER CONSUMPTION VIA SINGLE-ENDED OR DIFFERENTIAL OPERATION

CROSS-REFERENCE TO RELATED APPLICATIONS

The present application is related to U.S. patent application Ser. No. 10/289,777, Publication No. 20040203483, entitled "INTERFACE TRANSCEIVER POWER MANAGEMENT METHOD AND APPARATUS", filed on Nov. 7, 2002, having at least one common inventor and assigned to the same assignee. The specification of the above-referenced patent application is herein incorporated by reference.

BACKGROUND OF THE INVENTION

1. Technical Field

The present invention relates generally to communication link circuits, and more particularly, to digital signal transmitters having selectable drive capability and power consumption.

2. Description of the Related Art

Interfaces between present-day system devices and also between circuits have increased in operating frequency and complexity. In particular, high-speed serial interfaces include transmitters and receivers that typically consume relatively large amounts of the power budget of an integrated circuit. However, depending on channel conditions and parameters, the maximum output signal level of a transmission circuit may not be required for proper signal reception at the remote end of the interface. For example, the channel physical length may be shorter in some applications than in others, reducing signal degradation and thereby reducing transmit power requirements for the same receiver complexity.

Due to limited design resources and the need to satisfy the requirements of multiple interface applications, customers and channel conditions, transmitters and receivers within above-described interfaces are typically designed for the worst-case bit error rates and environmental conditions, leading to relatively complex receivers and high power transmitters. As a result, it is not always possible to provide a transmitter having lower power consumption when a high channel quality is available.

The above-incorporated Patent Application discloses an interface in which the transmitters and receivers have adjustable and/or adaptive parameters for finely tuning an interface to manage power consumption. One of the controllable parameters is the transmitter power level of the interface driver circuit(s). However, typical transmit power adjustment performed by changing the driver voltage and/or current levels is not always a preferable mechanism to adjust transmit power. Communications links within and between computer subsystems have reached bandwidths of between 5 gHz and 10 gHz and interface frequencies can be expected to increase in the future. Driver circuits operating at such high frequencies do not typically scale operation well over voltage or bias current adjustments, as internal impedances change with such adjustments causing mismatch and loss of power. Delay also typically increases with reduced transmitter power, compromising the integrity of the data window.

Transmitter drivers as described above are not generally simple digital buffers or inverters that switch power rail levels using an effectively near-zero impedance onto the interface line, but are typically linear driver circuits providing multiple stages of amplification or switches having progressively increasing and controlled signal current levels. The cascaded driver circuits progressively raise the power level of the signals internal to an integrated circuit or subsystem to the level required for transmission across the interface channel. Such complex circuits are susceptible to impedance changes due to power level adjustment and therefore such adjustment may not result in optimum performance for a given power consumption level. For example, if the mismatch between stages and at the input of the driver circuit increases when the transmit power level is dropped, the transmit power decrease will not be linear. Such non-linearity indicates an inefficiency of the driver at the lower power level. Similarly, if the transmitter is designed so that impedance matching is ideal at the lower power level, then at higher power consumption levels, the output power will not provide a linear increase with the consumption level. Delay necessarily increases with decreased signal levels through the stages due to device capacitance changes and charge effects relative to the reduced signal strength.

It is therefore desirable to provide an interface transmitter circuit having selectable power consumption that is efficient in both high and low power modes.

SUMMARY OF THE INVENTION

The objective of providing an interface transceiver having selectable reduced power consumption while retaining power efficiency is achieved in a method and apparatus.

The apparatus is a transmitter circuit for transmitting a digital signal and having multiple cascaded driver stages. The final driver stage has an output connected to one or more interface signal lines and has a pair of differential inputs. The power level of the transmitter circuit is controlled by selectively enabling one or more pre-driver circuits providing the input to one or both of the differential inputs, providing a reduction in power consumption. If the final portions of both pre-driver circuit paths are disabled, then a single-ended to differential signal converter is used to provide the inputs to the final driver stage, selected via a multiplexer. In fully differential mode, both pre-driver paths are fully are enabled and the single-ended to differential converter is disabled.

The selection and power control process may be programmable by a logic connection, register bit or via a signal from an interface quality measurement circuit. A remote transmitter may also be power-managed at the other end of the interface by transmitting a control signal to the remote transmitter.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
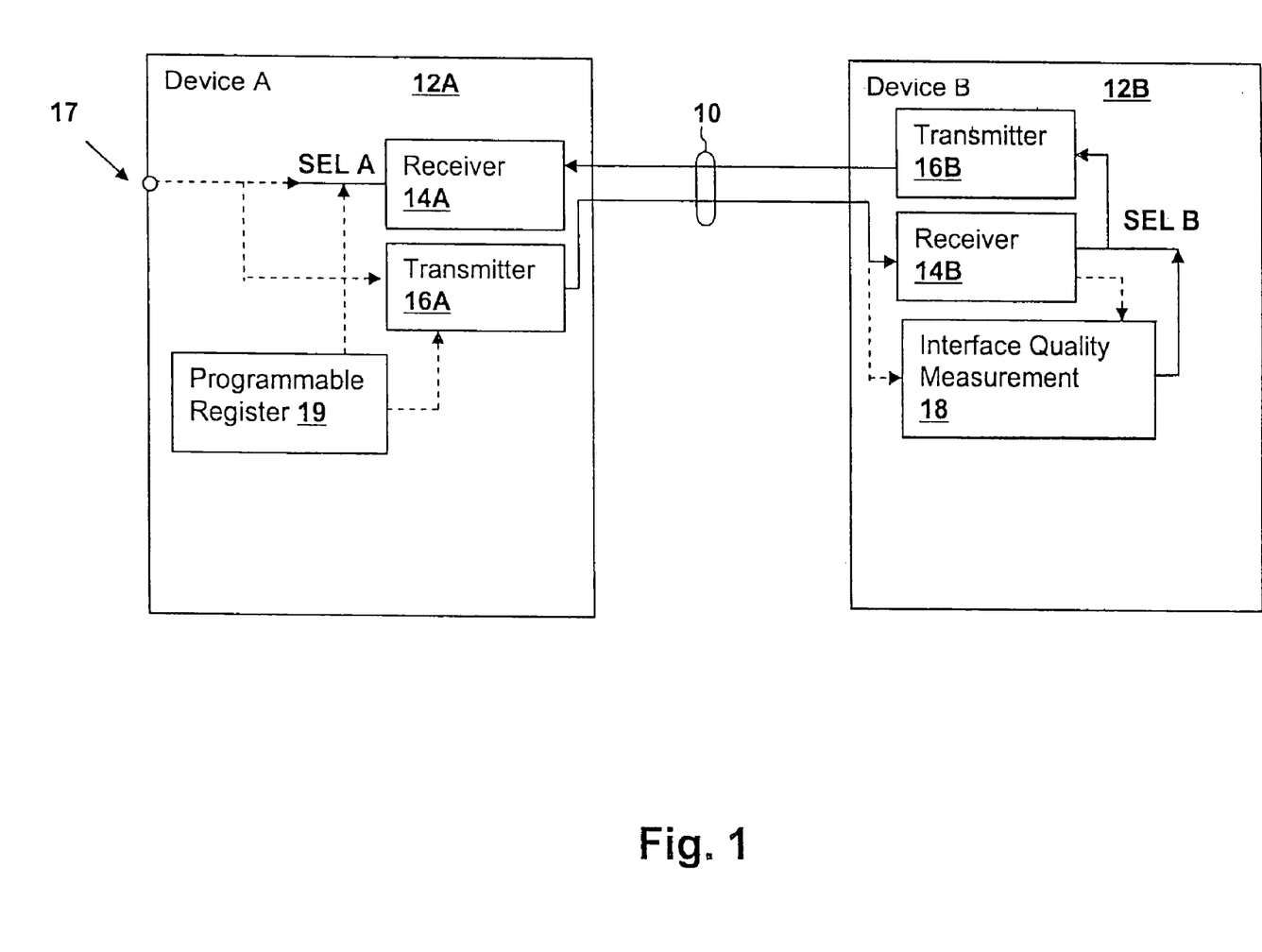
FIG. 1 is a block diagram of transceivers connected by an interface in accordance with an embodiment of the invention.

With reference now to the figures, and in particular with reference to FIG. 1, there is depicted a block diagram of transceivers 12A and 12B connected by an interface or channel 10 in accordance with an embodiment of the invention. Transceivers 12A, 12B may be located within a device such as a computer peripheral, a computer system, or within integrated circuits interconnected within a system. Interface 10 may be a single two wire bi-directional interface as depicted, or may be a full-duplex single wire interface or a bus having multiple transceivers in a half-duplex or full-duplex configuration. Transceivers 12A and 12B are connected to interface 10 each using a receiver 14A and 14B and a transmitter 16A and 16B, but the present invention is applicable to transmitters in general, and it should be understood that a transmitter in accordance with an embodiment of the invention may be incorporated in devices for connection to any of the above-specified types of interface 10, as well as other forms of electrical signal interconnection.

Transmitters 16A, 16B of the present invention incorporate power control mode selection inputs SELA and SELB that reduce the power consumption of the transmitter when channel conditions permit. Blocks that are unneeded within transmitters 16A, 16B are disabled by isolating one or more power supply rails from the block or by designing the block with an enable signal input that prevents or substantially reduces current flow through the block. Lower-power alternative signal path blocks within 16A, 16B that support only a fraction of the worst-case interface specification for the interface may also be substituted in place of higher-power consumption blocks that support transmission at the highest rates under the worst-case conditions for the interface.

Thus, the above-described transmitter circuits provide a selectable power consumption that can be used to provide lower power usage and dissipation within transceivers 12A and 12B, when channel conditions are good, while maintaining low bit error rates (BERs) using a higher power consumption state when channel conditions are poor.

The selection of power consumption states via select input SELA may be hard-wired or externally programmed using an external signal terminal 17 or may be programmed using a bit register 19 within transceiver 12A. Receiver 14A, transmitter 16A or both may be controlled by one or more selection signals, for example, multiple bits may be provided for each of transmitter 16A and receiver 14A so that power consumption may be very finely traded off for receiver processing power or transmitter signal strength, etc. Alternatively, a single bit or external terminal may be used to set a single binary power consumption selection for both transmitter 16A and receiver 14A. Details of receivers having selectable power consumption are detailed in the above-incorporated Patent Application and those receivers may be used in concert with the transmission circuits of the present invention.

Transceiver 12A is an example of a transceiver having external power mode selection via register programming or external connection. Wired or register selection of power modes is very useful in integrated circuits and systems, including computer systems, communication systems or peripherals. In such systems, external terminal 17 can be hard-wired depending on the application (e.g., known short shielded cable length attached to a peripheral dictates a high channel quality or connection of two transceivers on a high-quality circuit board also dictates high channel quality).

Transceiver 12B is an example of a transceiver having automatic channel-quality-based power level selection in response to a measurement performed by interface quality measurement block 18, which may be an eye-diagram circuit, an error detection circuit or other mechanism for detecting that the channel quality is less than a desired threshold. Select signal SEL B is provided by an output of interface quality measurement block 18 and automatically selects higher or lower transmitter power in conformity with the measured channel quality.

Another type of transceiver power consumption control is provided by an interface link wherein a register such as programmable register 19 may be set via reception of a command code sent over interface 10 and received by a receiver such as receiver 14A. Remote interface link control is useful for informing a transceiver about channel conditions when the transceiver being programmed has no ability to determine the channel quality or does not have information regarding channel conditions (such as cable length). Also, return of channel quality from the remote side of an interface provides absolute information about the transmitted signals, where measurement at the local side provides only an estimate based on reception of signals from the remote side. Therefore, in practice, it would be desirable to provide interface quality measurements at both ends of the interface and return channel quality measurement information to the originating side for controlling transmitter power in accordance with the present invention.

Figure 2:
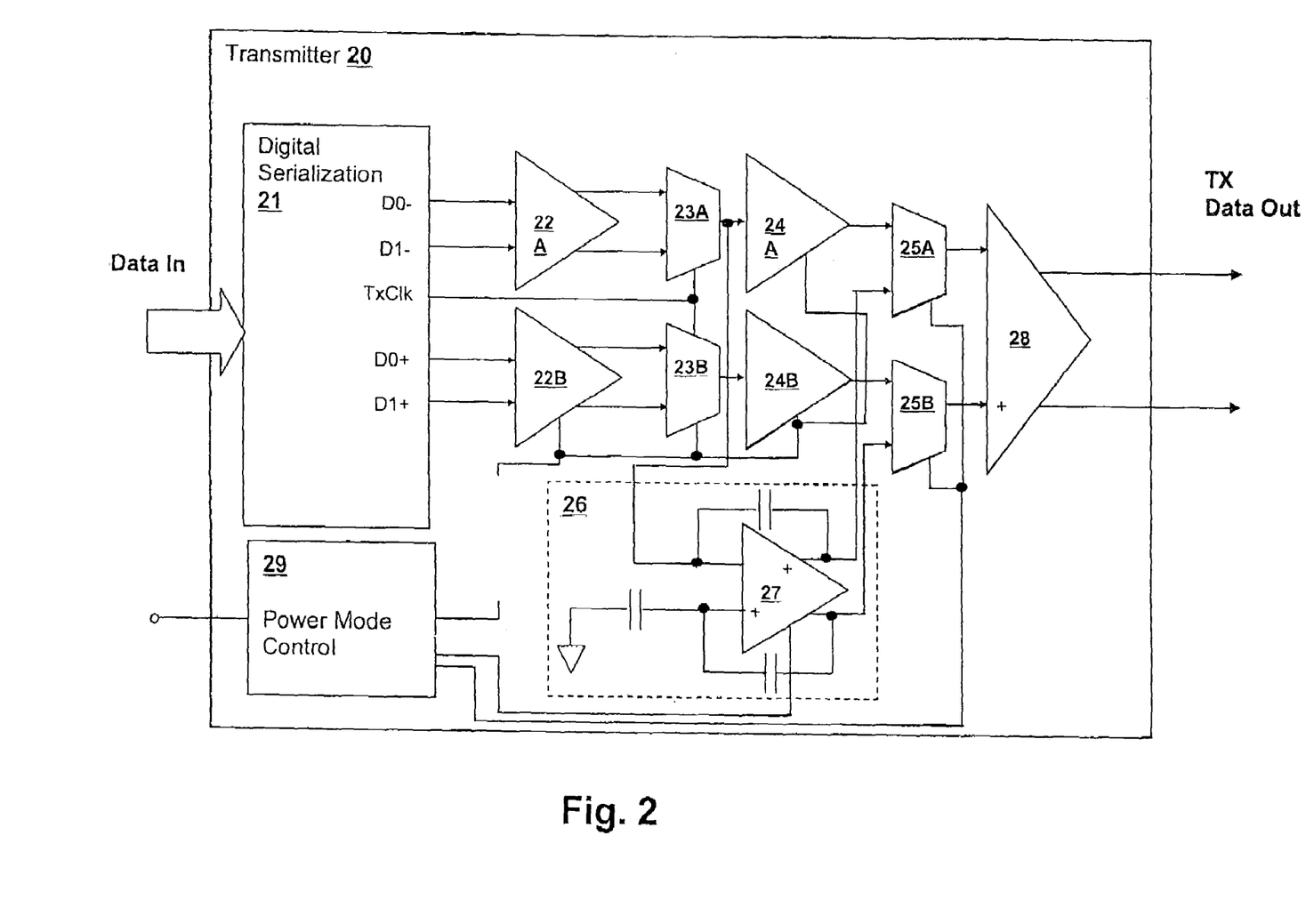
FIG. 2 is a schematic diagram of a transmission circuit in accordance with an embodiment of the invention.

Referring now to FIG. 2, details of a transmitter 20 in accordance with an embodiment of the invention are depicted. A digital serialization block 21 receives a plurality of Data In signals for serialization over interface 10. At the output of digital serialization block 21 four signals are provided in the depicted example: two differential pairs representing two distinct data signals. The circuit depicted in FIG. 2 is only illustrative of an example and should not be construed as limiting the invention. The present invention is equally applicable to signals that are not serialized/multiplexed at all.

Pre-buffers 22A and 22B receive a respective polarity signal from each of the differential pairs and provide a boosted signal to the inputs of a corresponding multiplexer 23A and 23B. Multiplexers 23A and 23B have select inputs connected to transmit clock signals that select one of the distinct data signals, providing the last stage of serialization. Thus, the outputs of multiplexers 23A and 23B represent a differential serialized data stream. However, in low power mode, power mode control 29 disables pre-buffer 22B, multiplexer 23B and another prebuffer 24B that normally receives half of the differential pair provided by multiplexers 23A and 23B. The above listed blocks are generally high power consumers and therefore disabling them results in a substantial reduction of power consumption by transmitter 20. In the depicted embodiment, pre-buffer 24A is also disabled and the function of providing a differential pair to output driver 28 is provided by a single-ended to differential converter block 26 designed for low power consumption. The output of output driver 28 is depicted as a differential pair, which generally would be the type of signaling used on such an interface in order to achieve the advantages of channel quality sufficient that the low power mode can be used under appropriate channel conditions. However, the internal architecture and power control of the present invention can be applied to a single-ended interface driver that has differential inputs.

Single-ended to differential converter block can be provided by a capacitively-coupled amplifier or comparator 27 as shown, or another digital or analog circuit capable of providing a differential output from a single-ended signal. Single-ended to differential converter block 26 is disabled by power mode control 29 when the high-power operating mode is selected. Multiplexers 25A and 25B have a select input coupled to power mode control 29 for selecting between outputs of single-ended to differential converter block 26 and the outputs of pre-buffers 24A and 24B.

Alternatively, if output driver 28 is designed such that it will operate with a single-ended input, the + input of output driver 28 may be appropriately biased and pre-buffer 24A can be left enabled, in which case multiplexer 25A is not needed. Multiplexer 25B may be needed depending on the output level of pre-buffer 24B when disabled.

Disabling the various blocks listed above is generally accomplished in one of two manners: one or more power supply rails are disconnected from the blocks via power control transistors, or the blocks are designed with internal devices that block some or all of the current conduction through the block, as in the case with digital circuits having internal circuits that can suppress switching action in response to a disable input.

The result of the power control of transmitter 20 is that the delay and signal strength through transmitter 20 is changed depending on power mode. Increased delay due to lower-power operation is tolerable when channel conditions permit, as is the lower signal strength provided when the low-power mode is selected. Such conditions can either be detected via the feedback mechanisms detailed with respect to FIG. 1 above, or may be selected based on expected channel conditions and architectures such as interface connection type and environment.

Figure 3:
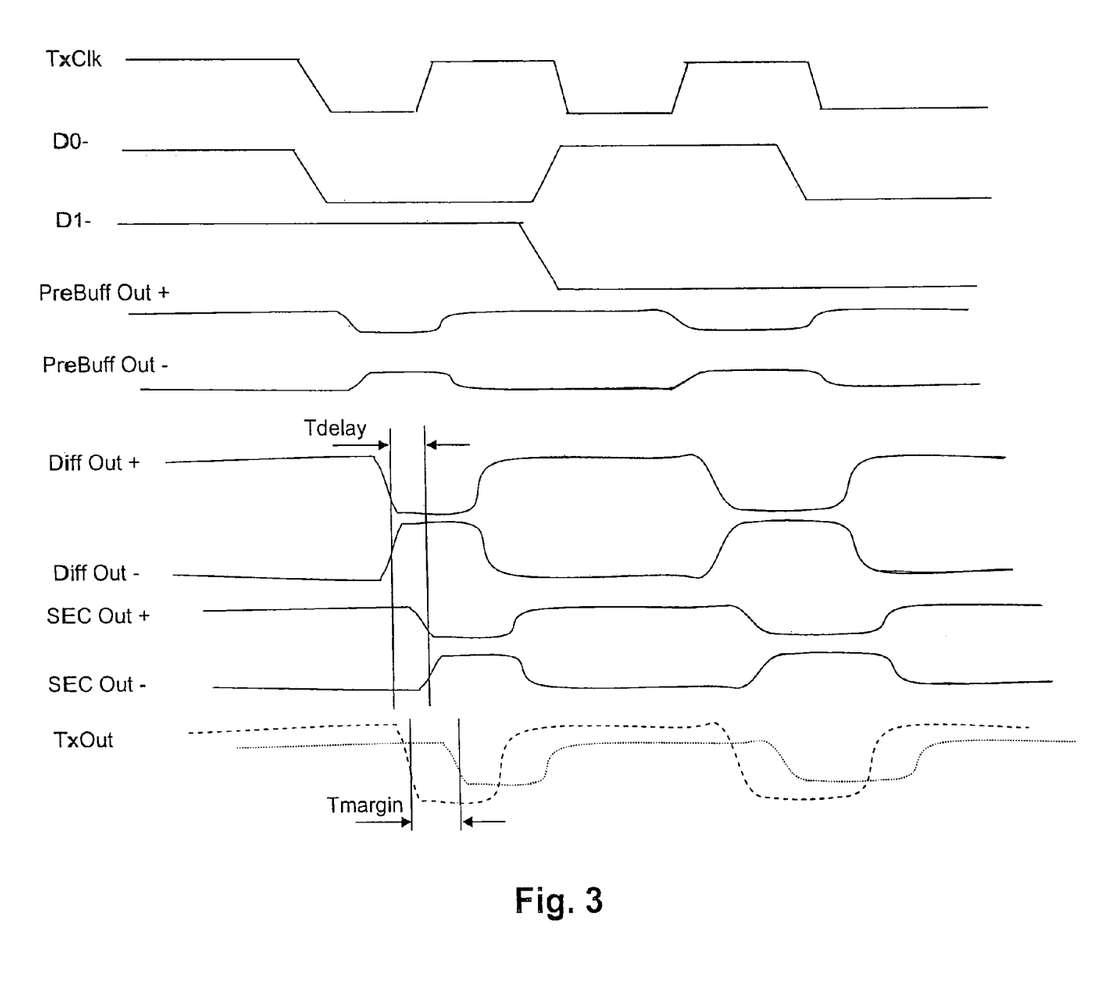
FIG. 3 is a signal diagram depicting signals within the circuit of FIG. 2.

Referring now to FIG. 3, a signal diagram depicting the timing and relative amplitude of signals within transmitter 20 is shown. Data signals D0− and D1− are shown for illustration (signals D0+ and D1+ would be complementary to them and are not shown). The outputs of multiplexers 23A and 23B are relatively low amplitude signals representing the multiplexed data signals as a differential pair PreBuff Out− and PreBuff Out+. (PreBuff Out+ is suppressed in low-power mode, as multiplexer 23B and pre-buffer 22B are disabled.) Next, the outputs of prebuffers 24A and 24B, Diff Out + and Diff Out − are shown as they would occur in high-power mode and the outputs of single-ended to differential converter 26, SEC Out+ and SEC Out− are shown as they would occur in low-power mode. Tdelay depicts the increased internal delay due to the lower-power operation of single-ended to differential converter 29 versus pre-buffers 24A and 24B, and the relatively lower amplitude of the SEC Out signals is also due to the lower-power operation. (It should be noted that any resulting skew from the single-ended to differential conversion is tolerable in low-power mode, as the low-power mode condition corresponds to a much wider jitter margin due to favorable link and channel conditions.) Finally, the TxOut signal is depicted as a dashed line (high power mode) and a dotted line (low power mode) to illustrate the increased delay and lower amplitude of the signal provided to interface 10. Tmargin represents the maximum potential delay under which the above power control scheme can used in low power mode. If the required delay margin at the remote interface is met when the low power mode delay of transmitter 20 is as depicted, then single-ended to differential converter 26 (and/or other blocks within transmitter 20 that are operational when in low power mode) can be scaled to operate at the power level producing that delay when transmitter 20 is in low power mode.

Figure 4:
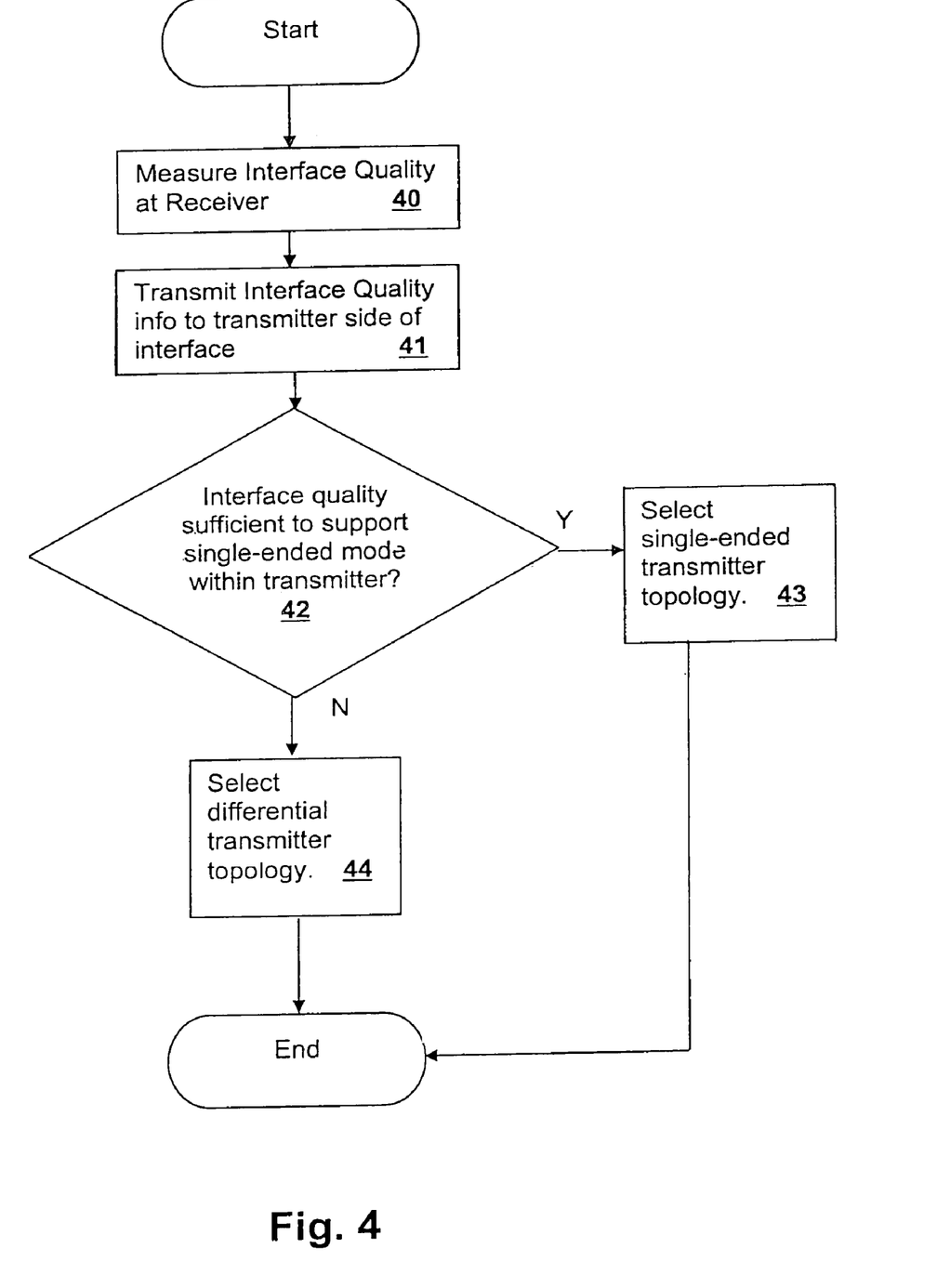
FIG. 4 is a flowchart depicting a method in accordance with an embodiment of the invention.

Referring now to FIG. 4, a control method in accordance with an embodiment of the present invention is shown in a flowchart. The depicted method illustrates the operation of the above-described circuits using feedback from interface quality measurement block 18. First, interface channel quality is measured (step 40) and channel quality information is sent to the transmitter side of the interface (step 41). If the interface channel quality is sufficient to support a lower power consumption state within transmitter 20 (decision 42), single-ended internal operation of transmitter 20 is selected (step 43). If the interface channel quality is not sufficient (decision 42) then the differential internal operation topology is selected (step 44). While the above-illustrated method provides a sophisticated control of signaling on interface 10, it should be understood that such control is not necessary to practice the present invention, which encompasses selection of the internal operating topology of transmitter 20 via programmatic or hardwired control as well. In such cases, decision 42 is made a priori, predicted during operation or determined in some other manner such as during an interface check or upon detection of error conditions. Step 43 or 44 is then performed in response to the hardwired or programmatic signal.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A transmission circuit for transmitting a digital signal to one or more interface conductors, comprising:
    an output driver having a differential input for receiving a differential input signal pair and one or more outputs coupled to said one or more interface conductors;
    a pair of pre-driver circuits each having an output coupled to an associated signal of said differential input signal pair;
    a control circuit for selectively disabling power supplied to at least one of said pre-driver circuits in response to a low-power selection state of a control signal, whereby power consumption of said transmission circuit is reduced while transmitting data through said output driver, wherein said control circuit disables at least a portion of both of said pair of pre-driver circuits in response to said low-power selection state of said control signal; and
    a single-ended to differential signal converter having an output coupled to an input of said output driver, and wherein said control circuit disables power supplied to said single-ended to differential signal converter when said control circuit enables said pair of pre-driver circuits in response to a high-power selection state of said control signal.

2. The transmission circuit of claim 1, further comprising a multiplexer having outputs coupled to said inputs of said output driver and inputs coupled to and for selecting between outputs of said single-ended to differential signal converter and said outputs of said pair of pre-driver circuits, and having a select input coupled to said control circuit for performing said selection, whereby said outputs of said single-ended to differential converter are selected for input to said output driver when said control signal is in said low-power selection state and said outputs of said pre-driver circuits are selected for input to said output driver when said control signal is in said high-power selection state.

3. The transmission circuit of claim 2, wherein said control circuit further disables said single-ended to differential converter when said control signal is in said high-power selection state.

4. The transmission circuit of claim 1, further comprising:
a second pair of pre-driver circuits each having an output coupled to an associated signal of said differential input signal pair; and
a control circuit for selectively disabling power supplied to at least one of said second pair of pre-driver circuits in response to said low-power selection state of said control signal.

5. The transmission circuit of claim 1, further comprising:
a first multiplexer for selecting between a pair of input signals and alternatively selecting an input signal from said pair of input signals in conformity with a data clock input, and wherein said first multiplexer has an output coupled to an input of a first one of said pre-driver circuit pair; and
a second multiplexer for selecting between an inverted pair of signals corresponding to said pair of input signals and alternatively selecting an inverted input signal from said inverted pair of signals in conformity with said data clock input, and wherein said second multiplexer has an output coupled to an input of a second one of said pre-driver circuit pair, and wherein said control circuit selectively disables said second multiplexer when said control signal is in said low-power selection state.

6. The transmission circuit of claim 5, further comprising:
at least one buffer circuit having outputs coupled to said first multiplexer for providing said first pair of input signals; and
at least one second buffer circuit having outputs coupled to said first multiplexer for providing said inverted pair of signals, and wherein said control circuit selectively disables said second buffer circuit when said control signal is in said low-power selection state.

7. The transmission circuit of claim 1, further comprising:
a first buffer circuit having an output coupled to an input of a first one of said pre-driver circuit pair; and
a second buffer circuit having an output coupled to an input of a second one of said pre-driver circuit pair, and wherein said control circuit selectively disables said second buffer circuit when said control signal is in said low-power selection state.

8. The transmission circuit of claim 1, wherein said control signal is provided from a programmable register within said transmission circuit.

9. The transmission circuit of claim 1, wherein said control signal is provided from a hard-wired terminal of said transmission circuit.

10. The transmission circuit of claim 1, wherein said output driver has a pair of differential outputs coupled to said one or more interface conductors.

11. The transmission circuit of claim 1, wherein said output driver has a single-ended output coupled to said one of said interface conductors.

12. A transmission circuit for transmitting a digital signal to one or more interface conductors, comprising:
an output driver having a differential input for receiving a differential input signal pair and one or more outputs coupled to said one or more interface conductors;
a pair of pre-driver circuits each having an output coupled to an associated signal of said differential input signal pair;
a control circuit for selectively disabling power supplied to at least one of said pre-driver circuits in response to a low-power selection state of a control signal, whereby power consumption of said transmission circuit is reduced while transmitting data through said output driver;
a first multiplexer for selecting between a pair of input signals and alternatively selecting an input signal from said pair of input signals in conformity with a data clock input, and wherein said first multiplexer has an output coupled to an input of a first one of said pre-driver circuit pair; and
a second multiplexer for selecting between an inverted pair of signals corresponding to said pair of input signals and alternatively selecting an inverted input signal from said inverted pair of signals in conformity with said data clock input, and wherein said second multiplexer has an output coupled to an input of a second one of said pre-driver circuit pair, and wherein said control circuit selectively disables said second multiplexer when said control signal is in said low-power selection state.

13. The transmission circuit of claim 12, further comprising a third multiplexer having outputs coupled to said inputs of said output driver and inputs coupled to and for selecting between outputs of said single-ended to differential signal converter and said outputs of said pair of pre-driver circuits, and having a select input coupled to said control circuit for performing said selection, whereby said outputs of said single-ended to differential converter are selected for input to said output driver when said control signal is in said low-power selection state and said outputs of said pre-driver circuits are selected for input to said output driver when said control signal is in said high-power selection state.

14. The transmission circuit of claim 13, wherein said control circuit further disables said single-ended to differential converter when said control signal is in said high-power selection state.

15. The transmission circuit of claim 12, further comprising:
a second pair of pre-driver circuits each having an output coupled to an associated signal of said differential input signal pair; and
a control circuit for selectively disabling power supplied to at least one of said second pair of pre-driver circuits in response to said low-power selection state of said control signal.

16. The transmission circuit of claim 12, further comprising:
at least one buffer circuit having outputs coupled to said first multiplexer for providing said first pair of input signals; and
at least one second buffer circuit having outputs coupled to said first multiplexer for providing said inverted pair of signals, and wherein said control circuit selectively disables said second buffer circuit when said control signal is in said low-power selection state.

17. The transmission circuit of claim 12, further comprising:
- a first buffer circuit having an output coupled to an input of a first one of said pre-driver circuit pair; and
- a second buffer circuit having an output coupled to an input of a second one of said pre-driver circuit pair, and wherein said control circuit selectively disables said second buffer circuit when said control signal is in said low-power selection state.

18. The transmission circuit of claim 12, wherein said control signal is provided from a programmable register within said transmission circuit.

19. The transmission circuit of claim 12, wherein said control signal is provided from a hard-wired terminal of said transmission circuit.

20. The transmission circuit of claim 12, wherein said output driver has a pair of differential outputs coupled to said one or more interface conductors.

21. The transmission circuit of claim 12, wherein said output driver has a single-ended output coupled to said one of said interface conductors.

* * * * *